US005670584A

United States Patent [19]

Al Ghatta et al.

[11] Patent Number: 5,670,584

[45] Date of Patent: Sep. 23, 1997

[54] POLYESTER COMPOSITIONS SUITABLE FOR THE MANUFACTURE OF FIBRES AND FILMS WITH HIGH ELASTIC MODULUS

[75] Inventors: Hussain Ali Kashif Al Ghatta, Fiuggi; Tonino Severini, Colleferro; Sandro Cobror, Napoli, all of Italy

[73] Assignee: Sinco Engineering S.p.A., Italy

[21] Appl. No.: 532,628

[22] PCT Filed: Apr. 29, 1994

[86] PCT No.: PCT/EP94/01370

§ 371 Date: Oct. 4, 1995

§ 102(e) Date: Oct. 4, 1995

[87] PCT Pub. No.: WO94/26821

PCT Pub. Date: Nov. 24, 1994

[30] Foreign Application Priority Data

| | | | |
|---|---|---|---|
| May 7, 1993 | [IT] | Italy | MI93A0916 |
| Jun. 18, 1993 | [IT] | Italy | MI93A1317 |

[51] Int. Cl.[6] ..... C08L 67/02

[52] U.S. Cl. ..... 525/444; 525/437

[58] Field of Search ..... 525/437, 444

[56] References Cited

U.S. PATENT DOCUMENTS

| | | | |
|---|---|---|---|
| 3,553,157 | 1/1971 | Dijkstra et al. . | |
| 3,637,595 | 1/1972 | Cottis et al. . | |
| 3,804,805 | 4/1974 | Kuhfuss et al. . | |
| 4,093,595 | 6/1978 | Elliott . | |
| 4,161,470 | 7/1979 | Calundann . | |
| 4,360,658 | 11/1982 | Jackson, Jr. et al. . | |
| 4,447,577 | 5/1984 | Bayha . | |
| 4,668,760 | 5/1987 | Boudreaux, Jr. et al. . | |
| 5,324,795 | 6/1994 | Suenaga | 525/444 |

FOREIGN PATENT DOCUMENTS

| | | |
|---|---|---|
| 0 041 327 | 12/1981 | European Pat. Off. . |
| 0 314 785 | 5/1989 | European Pat. Off. . |
| 0 422 282 | 4/1991 | European Pat. Off. . |
| 9324574 | 12/1993 | WIPO . |

OTHER PUBLICATIONS

A.M. Sukhadia et al., "Mixing History on the Morphology and Properties of Thermoplastic/LCP Blends," Intern. Polymer Processing VII 3, 218–228 (Munich 1992).

Chemical Abstracts, vol. 97, no. 24, Dec. 13, 1982, abstract no. 199462h, Asahi Chemical Ind. Co., Ltd., "Polyester blend fibers," p. 69, col. 2 (JP A 82 101 020).

*Primary Examiner*—Patricia A. Short
*Attorney, Agent, or Firm*—Edward D. Manzo; Mark J. Murphy

[57] ABSTRACT

Polyester resins containing up to 5% by weight of a polymeric liquid crystal and an upgrading agent capable of increasing the I. V. of the resin by polyaddition reaction in the solid state with the end groups of the resin. Fibres, films and biaxially oriented articles obtained from the resins.

5 Claims, No Drawings

POLYESTER COMPOSITIONS SUITABLE FOR THE MANUFACTURE OF FIBRES AND FILMS WITH HIGH ELASTIC MODULUS

BACKGROUND OF THE INVENTION

The present invention relates to polyester compositions, containing polymeric liquid crystals (LCP) suitable for the preparation of stretched articles such as films and fibres, endowed with high mechanical properties, particularly a high elastic modulus.

It is known that liquid crystals (LCP) are used as a reinforcing material of thermoplastic polymers to improve their mechanical properties. The improvement is shown when the LCP quantity is at least 10% by weight of the polymeric matrix. Quantities lower than 5% determine under the conditions of experimental use only marginal increases.

The lowest concentrations used in literature do not have values lower than 1–2% by weight. This is due to the fact that with these low concentrations, and under the experimental use conditions there is no improvement of the resin mechanical properties. The improvements, moreover, depend on the degree of stretching carried out. Stretching ratios of at least 20:1 are necessary in the case of cooled filaments at the extruder exit to obtain the highest increases. In the case of films where the practicable stretching ratios are generally between 2:1 and 10:1, there are no significant improvements of consequence of the insufficient molecular orientation obtainable (A. M. Sukhadia et al.—Intern.

SUMMARY OF THE INVENTION AND DETAILED DESCRIPTION OF THE PREFERRED EMBODIMENT

Polymer Processing VII (1992) 3, 218–228). It has been unexpectedly found that it is possible to obtain oriented articles, such as fibres, films and bioriented containers, endowed with high mechanical properties, particularly with a high elastic modulus, by starting from polyester resins mixed with a polyfunctional upgrading compound, capable of increasing the molecular weight of the resin by polycondensation and/or polyaddition reactions in the solid state with the end groups of the resin. And the containing in the polymer matrix, relatively small quantities, lower than 5% by weight of a liquid polymeric crystal.

The formed article has to be subjected to stretching to obtain the desired effect. The stretching ratio is at least 2:1 and is generally between 2:1 and 10:1.

The stretching temperature is a little higher than the Tg of the polymer in the case of stretching of films and bioriented articles. Suitable temperatures are between 80 and 120° C. Regarding the fibres, the stretching can be carried out in two phases. In the first phase, the stretching is carried out at temperatures lower than Tg. In the second phase, the stretching is carried out at higher temperatures.

In the case of films, the stretching ratio is preferably between 4:1 and 9:1. In the case of fibres, the stretching ratio is preferably between 2:1 and 6:1.

The LCP crystals are incorporated into the polyester resin under such mixing conditions, as to assure a homogeneous distribution of the same in the polymer matrix. The preferred method comprises mixing of the liquid crystals in the melted polymer mass at a temperature between 250 and 320° C. The temperature is chosen in accordance with the processability temperature of the liquid crystal. Therefore, it generally increases when the latter increases. Twin screw extruders are preferably used. Counter rotating and intermeshing twin screw extruders are particularly suitable. The residence time in the extruder is generally between 20 and 200 sec.

The polymer mixture coming out of the extruder can be pelletized, and the chips used for the preparation of the stretched articles. Alternatively, the blend is sent directly to the filming or spinning apparatus.

The polyester resins of the present invention are converted into fibres and stretched films or other bioriented articles according to the conventional techniques. Examples of bioriented articles are the sheets in which the biorientation is obtained by calendering, and the bioriented containers obtained by injection blow molding.

The liquid crystals are preferably used in a quantity lower than 2% by weight on the resin. Preferably, the crystals are used in quantities between 0.5 and 1.5% by weight.

The quantity of upgrading agent is generally between 0.1 and 2% by weight. It is preferably lower than 1% by weight. The polymeric liquid crystals LCP are polymers that tend to maintain a crystal order in the molten state. Representative liquid crystals LCP include following types:

Poly(oxybenzoyl-co-ethylenterephthalate) (PHBA/ET:4/1) which is produced by Eastman Chemical & Unitika and sold under the Rodrum trademark (melting point 230° C.);

Poly(oxybenzoyl-co-biphenylterephthalate)(PHBA/TA:2/1/1) which is produced by Amoco Performance Products and sold under the Xydar trademark (melting point 420° C.);

Poly(oxybenzoyl-co-oxynaphtoil) (PHBA/HNA:7/3) which is produced by Hoechst Celanese and sold under the Vectra trademark (melting temperature 275° C.); and Poly(phenil-para-phenylenterephthalate) (PPHQ/TA) which is produced by DuPont (melting point 340° C.). Liquid crystals of these types are described in the U.S. Pat. Nos. 3,804,805; 3,637,595; 4,161,470; 4,093,595; 4,447,577; 4,668,760; 4,360,658 whose description is herewith incorporated by reference.

The preferred liquid crystal is Vectra A900 of Hoechst / Celanese.

The polyfunctional upgrading agents are preferably compounds containing two or more groups capable of addition reactions with the OH and COOH end groups of the polyester resin. The most preferred compounds are the dianhydrides of tetracarboxylic aromatic acids. The preferred compound of these is the dianhydride of pyromellitic acid. Other usable dianhydrides are tetrahydrofuran dianhydride, bis (3, 4 dicarboxyphenil) thither dianhydride, dianhydride of (diphenil tetracarboxyl) sulfone, dianhydride of benzophenonetetracarboxylic acid, dianhydride of cyclopentanetetracarboxylic acid. Addition compounds of one mole of an alkylene glycol or polyalkylene glycol with two moles of pyromellitic dianhydride or other dianhydrides are also usable.

The polyester resins usable for the preparation of the composition of the invention include the polycondensation products of an aromatic bicarboxylic acid with a diol containing 1–12 carbon atoms. Representative acids are terephthalic acid, naphtalenebi-carboxylic acid, biphenylbicarboxylic acids and their esters; representative glycols are ethyleneglycol, butyle-neglycol 1,4 dimethylol-cyclohexane. In the definition of polyester resin are included the copolyesters containing terephthalic acid units and units from other acids such as isophtalic acid and elastomeric copolyesters including sequences deriving from terephthalic acid or from another bicarboxylic acid and sequences deriving from a polyalkylene glycol.

The polyester resins may contain, suitably blended, polymers such as polyamides, polycaprolactones, polycarbonares, polyolefines.

The resins can be blended with the conventional additives normally added to the resins. Examples of these additives are the antioxidants, thermal stabilizers, dyes and pigments, flame retardant compounds, plasticizers. Reinforcing charges such as glass fibres or other types of charges can be used. The usable quantities are those normally used in the polyester resins.

The resins intrinsic viscosity for fibres and films is generally between 0.6 and 0.8 dl/g. Higher viscosities can be used. The required viscosity values can be obtained by subjecting the resin to polycondensation/reactions in the solid state without using upgrading agents or to polyaddition/poly condensation reactions in the presence of an upgrading agent of the above mentioned type.

Another aspect of the present invention, is that significant improvements in the films and stretched fibres mechanical properties, even if lower than those obtainable with the combined used of the liquid crystals and an upgrading agent, can be obtained when the polyester resin is mixed with liquid crystals alone without upgrading agents, in a quantity lower than about 2% by weight on the resin. Remarkable results are obtained with a quantity lower than 1% by weight, for example 0.5% by weight. The fibres, films and bioriented articles of the present invention find wide application in all those sectors where high mechanical properties are required, and also in sectors where high properties of gas barrier are required.

The following examples are given to illustrate but not to limit the present invention.

EXAMPLE 1

10 kg/h of a mixture at 99.5% by weight of Polyethylenete-rephthalate (PET) having an I.V. of 0.61 dl/g and 0.5% by weight of vectra A 950 (Hoechst Celanese) previously vacuum dried at 140° C. for 10h and containing 0.3% by weight of pyromellitic dianhydride (PMDA) was fed into a counter rotating and intermeshing extruder and then pelletized.

The extrusion conditions were as follows:

Screw ratio L/D = 36
Screw rotation speed = 45 rpm
Barrel temperature = 260° C.
Chips feed speed = 10 Kg/h
Die type = circular with 3 mm dia.

Comparative Example 1

The preparation of example 1 was repeated with the difference that it used PET alone, without Vectra A950 and PMDA.

EXAMPLE 2

The preparation of example 1 was repeated with the difference that it used PET mixed only with 0.5% by weight of Vectra A950.

EXAMPLE 3

The preparation of example 1 was repeated with the difference that it used a blend of 94.7% by weight of PET, 5% by weight of Vectra A950 and 0.3% by weight of PMDA.

EXAMPLE 4

The preparation of example 3 was repeated with the difference that it used a blend of 98% by weight of PET and 2% by weight of Vectra A 950.

EXAMPLE 5

Chip samples, prepared from the mixtures according to the previous examples, were extruded continuously in filming equipment including a monoscrew extruder provided with a die suitable for cast film production.

The extrusion conditions were as follows:

Screw ratio L/D = 28
Screw rotation speed = 80 rpm
Barrel temperature = 265° C.
Head temperature = 275° C.

The extruded film was collected on slow chilled rollers, then on slow heated rollers and on stretching rollers V1 and V2.

The preparation conditions were as follows:

Screw speed = 60 rpm
V1 roller speed = 5
V2 roller speed = 15.20.25.30.35.40.45.
Stretch ratio = 3. 4. 5. 6. 7. 8. 9.
Cooled roller (temp.) = 7° C.
Heated roller (temp.) = 87° C.

The obtained films properties are shown in tables A, B, C, D, E

TABLE A (PET/0,5% VECTRA/0,3% PMDA-Ex. 1)

| Stretch ratio | Modulus (GPa) | Tensile strength (MPa) | Strain at break (%) |
|---|---|---|---|
| 4 | 6.3 | 247 | 21 |
| 5 | 10.0 | 430 | 13 |
| 6 | 6.4 | 551 | 13 |
| 7 | 7.1 | 518 | 10 |
| 8 | 6.8 | 258 | 13 |
| 9 | 5.6 | 414 | 13 |
| 10 | 5.8 | 379 | 13 |

TABLE B (PET/5% VECTRA/0,3% PMDA-Ex. 3)

| Stretch ratio | Modulus (GPa) | Tensile strength (MPa) | Strain at break (%) |
|---|---|---|---|
| 3 | 4.3 | 148 | 48 |
| 4 | 5.3 | 250 | 41 |
| 5 | 7.8 | 372 | 48 |
| 6 | 5.4 | 445 | 32 |
| 7 | 5.1 | 670 | 13 |

TABLE C (PET/0,5% VECTRA-Ex. 2)

| Stretch ratio | Modulus (GPa) | Tensile strength (MPa) | Strain at break (%) |
|---|---|---|---|
| 4 | 4.4 | 204 | 67 |
| 5 | 3.9 | 484 | 15 |
| 6 | 5.9 | 314 | 42 |
| 7 | 6.2 | 294 | 26 |

TABLE D (PET/2% VECTRA-Ex. 4)

| Stretch ratio | Modulus (GPa) | Tensile strength (MPa) | Strain at break (%) |
|---|---|---|---|
| 3 | 2.2 | 68 | 41 |
| 4 | 4.4 | 143 | 57 |
| 5 | 3.2 86 | 47 | |
| 6 | 5.3 | 159 | 23 |
| 7 | 5.2 | 165 | 26 |

TABLE E (PET Comparative ex. 1)

| Stretch ratio | Modulus (GPa) | Tensile strength (MPa) | Strain at break (%) |
|---|---|---|---|
| 4 | 2.0 | 192 | 32 |
| 5 | 2.5 | 253 | 20 |

Analytical Determinations

The intrinsic viscosity was determined in a solution of 0.5 g of resin in 100 ml of a solution of 60/40 by weight of phenol and tetrachlorethane operating at 25° C. according to ASTM-D 4603-86.

The film tensile properties were determined according to ASTM-D 882, using an INSTRON tensile tester (Mod. 4505).

We claim:

1. A polyester resin mixed in the melt with a dianhydride of a tetracarboxylic acid and containing, dispersed in the polyester resin, a polymeric liquid crystal in a quantity of up to about 5% by weight of the resin.

2. A polyester resin according to claim 1 wherein the dianhydride is pyromellitic dianhydride.

3. A polyester resin according to claims 1 or 2 wherein the dianhydride is in an amount from 0.05 to 2% by weight.

4. A polyester resin according to claims 1 or 2 wherein the liquid crystal is a copolyester selected from the group consisting of poly(oxybenzoyl-co-ethylene terephthalate) and poly (oxybenzoil-co-oxynaphtol).

5. A polyester resin according to claim 2 wherein the liquid crystal is present in a quantity from 0.1 to 2% by weight.

* * * * *

UNITED STATES PATENT AND TRADEMARK OFFICE

CERTIFICATE OF CORRECTION

PATENT NO. : 5,670,584

DATED : September 23, 1997

INVENTOR(S) : Al Ghatta, et al.

It is certified that error appears in the above-identified patent and that said Letters Patent is hereby corrected as shown below:

Col. 1, ln. 30, after "Intern.", insert --Polymer Processing VII (1992) 3, 218-228)--.

Col. 1, ln. 35, delete "Polymer Processing VII (1992) 3, 218-228)".

Col. 1, ln. 43, change "the" (third occurrence) to --then--

Col. 1, ln. 44, delete comma (second occurrence).

Col. 2, ln. 21, after "include", insert --the--.

Col. 4, ln. 36, change "21" to --31--.

Col. 4, ln. 53, change "445" to --448--.

Col. 5, ln. 9, after "3.2", add a tab.

Col. 5, ln. 10, change "159" to --158--.

Signed and Sealed this

Twenty-fourth Day of February, 1998

*Attest:*

BRUCE LEHMAN

*Attesting Officer*

*Commissioner of Patents and Trademarks*